United States Patent
Nam et al.

(10) Patent No.: US 7,505,071 B2
(45) Date of Patent: Mar. 17, 2009

(54) HORIZONTAL CHARGE COUPLED DEVICE DRIVING CIRCUIT WITH REDUCED POWER CONSUMPTION, SOLID-STATE IMAGE-SENSING DEVICE HAVING THE SAME, AND DRIVING METHOD OF THE SOLID-STATE IMAGE-SENSING DEVICE

(75) Inventors: Jung-hyun Nam, Suwon-si (KR); Jae-seob Roh, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 691 days.

(21) Appl. No.: 11/067,023

(22) Filed: Feb. 28, 2005

(65) Prior Publication Data
US 2005/0253948 A1  Nov. 17, 2005

(30) Foreign Application Priority Data
May 11, 2004  (KR) ............... 10-2004-0033075

(51) Int. Cl.
*H04N 5/335* (2006.01)
(52) U.S. Cl. .................................... 348/312
(58) Field of Classification Search ............. 348/311, 348/312, 320, 321, 323
See application file for complete search history.

(56) References Cited

U.S. PATENT DOCUMENTS 3,838,293 A * 9/1974 Shah ..................... 377/79
4,597,092 A * 6/1986 Furusawa et al. ............. 377/63
4,907,089 A * 3/1990 Yamaguchi et al. ......... 348/312
5,461,491 A * 10/1995 Degi ........................ 358/482
5,731,722 A * 3/1998 Sugiki et al. ................ 327/111
6,798,451 B1  9/2004 Suzuki et al.
2001/0025913 A1* 10/2001 Tanimoto ................. 250/208.1
2003/0020821 A1*  1/2003 Watanabe et al. ........... 348/312

FOREIGN PATENT DOCUMENTS

| JP | 59-193598 | 11/1984 |
| JP | 59-153598 | 11/1987 |
| JP | 5-325590 | 12/1993 |
| JP | 2000-029530 | 1/2000 |
| JP | 2000-29530 | 1/2000 |
| JP | 2000-050169 | 2/2000 |
| KR | 1993-16808 | 8/1993 |
| KR | 1995-031509 | 11/1995 |
| KR | 2001-0080921 | 8/2001 |

* cited by examiner

*Primary Examiner*—Tuan Ho
*Assistant Examiner*—Kent Wang
(74) *Attorney, Agent, or Firm*—Lee & Morse, P.C.

(57) ABSTRACT

A horizontal charge coupled device (CCD) driving circuit, a solid-state image-sensing device having the same, and a method of driving the solid-state image-sensing device, transmits image signals using horizontal driving signals having a middle voltage during rising and falling of the horizontal signals. The middle voltage of the horizontal driving signals is generated when an equipotential switch is turned "on" while the output nodes of buffer circuits are in a floating state.

17 Claims, 6 Drawing Sheets

HORIZONTAL CHARGE COUPLED DEVICE DRIVING CIRCUIT WITH REDUCED POWER CONSUMPTION, SOLID-STATE IMAGE-SENSING DEVICE HAVING THE SAME, AND DRIVING METHOD OF THE SOLID-STATE IMAGE-SENSING DEVICE

BACKGROUND OF THE INVENTION

1. Field of the Invention

The present invention relates to a solid-state image-sensing device. More particularly, the present invention relates to a charge coupled device (CCD) solid-state image-sensing device.

2. Description of the Related Art

Figure 1:
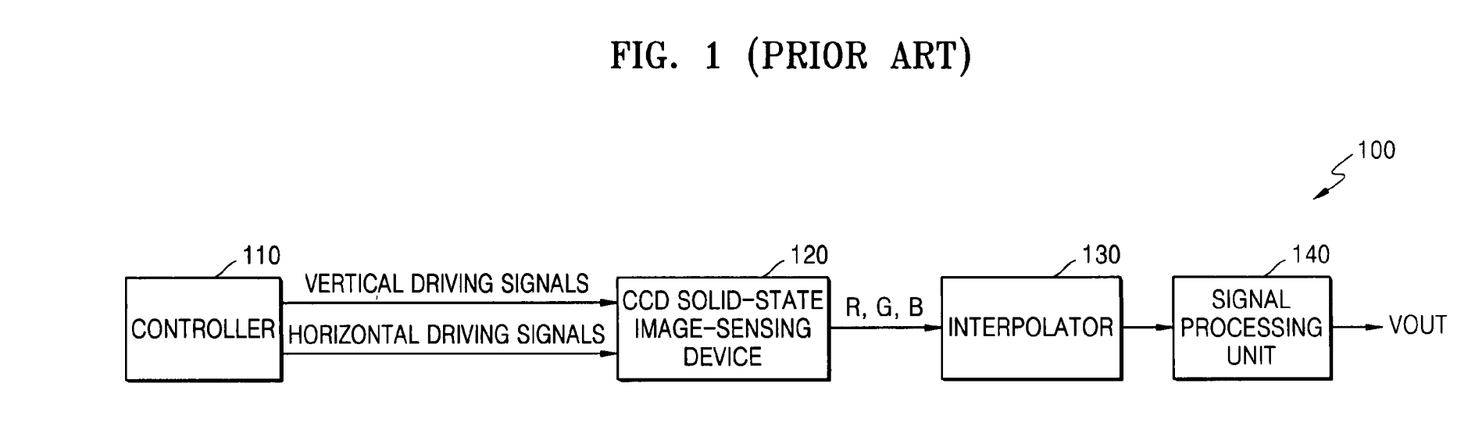
FIG. 1 is a block diagram of a color solid-state image-sensing device system using a conventional charge coupled device (CCD) solid-state image-sensing device.

FIG. 1 is a block diagram of a conventional color solid-state image-sensing device system 100 using a conventional CCD solid-state image-sensing device 120. Referring to FIG. 1, the color solid-state image-sensing device system 100 includes a controller 110, the CCD solid-state image-sensing device 120, an interpolator 130, and a signal processing unit 140. The color solid-state image-sensing device system 100 is applied in, for example, a mobile phone and a digital still camera. The CCD solid-state image-sensing device 120 senses visible images, converts the images into electrical signals, and periodically generates color image data (red, green, and blue). The controller 110 generates vertical driving signals and horizontal driving signals to drive the CCD solid-state image-sensing device 120. The three-color (red, green, and blue) signals R, G, and B are interpolated by the interpolator 130. The interpolated three-color signals R, G, and B are output as Vout to and displayed on a display device, e.g., a liquid crystal display (LCD), via the signal processing unit 140.

Particularly, the solid-state image-sensing device 120 includes photodiodes arranged in a two-dimensional matrix, a vertical CCD (not shown) for transmitting electric charge packets vertically while connected to each photodiode, and a horizontal CCD (not shown) for receiving the electric charge packets output from the vertical CCD and transmitting them horizontally. The vertical CCD is controlled by the vertical driving signals and transmits the electric charges generated by the photodiodes vertically to the horizontal CCD. The horizontal CCD is controlled by the horizontal driving signals, which are generated by the controller 110, and receives the electric charge packets output from the vertical CCD and transmits them horizontally.

The driving of the CCD solid-state image-sensing device 120 is usually composed of, e.g., a vertical drive of tens of kHz, a horizontal drive of tens of MHz, a reset drive for the output, applications of other bias voltages, etc. The vertical drive needs a separate driving circuit because the voltage level required by the vertical drive is different from the output level of a typical logic circuit. The horizontal drive uses a conventional buffer logic circuit in a simple pull up-pull down form.

Figure 2:
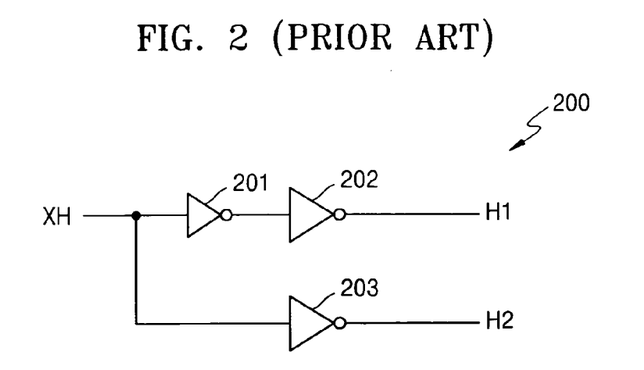
FIG. 2 is a block diagram of a horizontal CCD driving circuit of the CCD solid-state image-sensing device of FIG. 1.

FIG. 2 is a block diagram of a horizontal CCD driving circuit 200 of the CCD solid-state image-sensing device 120 of FIG. 1. Referring to FIG. 2, the horizontal CCD driving circuit 200 in the controller 110 typically generates at least two horizontal driving signals H1 and H2 to maximize transmission efficiency. That is, the at least two horizontal driving signals H1 and H2 with different logic states from each other are generated at inverters 201, 202 and 203 from a clock signal XH for driving the horizontal CCD.

When the CCD solid-state image-sensing device 120 is to be adopted in small mobile devices, e.g., mobile phone cameras or digital still cameras, reducing power consumption becomes more critical. To solve this problem, bias voltage and current of an amplifier at the output end have been reduced. However, in the case of the horizontal drive, an increase in capacitance corresponding to an increase in the resolution of the CDD solid-state image-sensing device 120, and overall power consumption of the same, continue to increase. The capacitance of the CCD solid-state image-sensing device 120 is hundreds to thousands of pF, and an alternating current (AC) for repeatedly charging and discharging the capacitance during operation is a major cause of power consumption when the operating frequency is high. In this case, the power consumption Pø, which depends on the driving signal, can be represented by Equation (1) below. In Equation (1), f is driving frequency, C is capacitance, and V is voltage amplitude.

$$P\phi = f \times C \times V^2 \tag{1}$$

In the vertical CCD drive of the conventional CCD solid-state image-sensing device 120, the operating frequency is about 10-20 kHz, the capacitance is about 500-2000 pF, and the voltage amplitude is about 5-10 V. Accordingly, the power consumption is in the range of 0.12-4 mW. In the horizontal CCD drive, the operating frequency is about 8-40 MHz, the capacitance is about 10-50 pF, and the voltage amplitude is about 3-5 V. Accordingly, the power consumption is in the range of 0.72-50 mW. Thus, the power consumption of the horizontal CCD drive is higher than the vertical CCD drive, and tends to incrementally increase as the resolution increases. In the CCD solid-state image-sensing device 120 designed to be integrated into small mobile devices, the very end driving voltage of an amplifier at the output end has been reduced from 12-15 V to 5 V, which reduces the overall power consumption to 73 mW. However, the power consumption in the horizontal CCD drive is around 37.4 mW, thereby consuming about 50% of the total power.

A method of reducing the power consumption in the horizontal CCD drive by the driving signals of opposite from each other includes three devices, which perform switching operations, between a driving signal outputting unit and a horizontal CCD. Connection of driving signals is open while they are being inverted into another logic state, and signal lines are equipotentialized. However, when signals to open the connection of the driving signals and signals to equipotentialize the signal lines are simultaneously applied, a switch for equipotential may be connected while the connection of the driving signal is not completely open due to the difference in time each switch needs to respond. Here, power sources are short-circuited through output buffers. Accordingly, in the output buffers, high current instantly flows through the switch for the equipotential. As a result, the power saved may be decreased, and, in the extreme, power consumption may even be higher than in the conventional technology.

SUMMARY OF THE INVENTION

The present invention is therefore directed to a horizontal charge coupled device (CCD), which overcomes one or more of the disadvantages and problems of the related art.

It is a feature of an embodiment of the present invention to provide horizontal driving signals generated at reduced power consumption, a solid-state image-sensing device having the same, and a method of driving the same.

It is another feature of an embodiment of the present invention to provide a horizontal charge coupled device (CCD) driving circuit, a solid-state image-sensing device having the same, and a method of driving the solid-state image-sensing device, that transmits image signals using horizontal driving signals having a middle voltage during rising and falling of the horizontal signals.

At least one of the above and other features and advantages of the present invention may be realized by providing a horizontal charge coupled device (CCD) driving circuit of a solid-state image-sensing device, including an inverter for inverting a clock signal and outputting a first horizontal driving signal, a buffer circuit for buffering the clock signal and outputting a second horizontal driving signal, a first output switch for selectively outputting or not outputting the first horizontal driving signal in response to a logic state of a first control signal, a second output switch for selectively outputting or not outputting the second horizontal driving signal in response to the logic state of the first control signal, and an equipotential switch for selectively short-circuiting or disconnecting output terminals of the first and second horizontal driving signals of the first and second output switches in response to a logic state of a second control signal, wherein the logic state of the second control signal changes at a different time than the logic state of the first control signal.

The first control signal may change from a second logic state to a first logic state and remain in the first logic state for a predetermined time after rising and falling of the clock signal. The second control signal may change from the first logic state to the second logic state and remain in the second logic state for a predetermined time while the first control signal is in the first logic state.

The equipotential switch may keep the output terminals of the first and second horizontal driving signals of the first and second output switches in an equipotential of a predetermined middle voltage by short-circuiting the output terminals while the first control signal is in the first logic state and the second control signal is in the second logic state. The inverter, the buffer circuit, and the equipotential switch may not be simultaneously activated during a predetermined time interval between when the logic states of the first and second control signals change.

At least one of the above and other features and advantages of the present invention may be realized by providing a horizontal CCD driving circuit of a solid-state image-forming device including a first buffer circuit for outputting a first horizontal driving signal in response to a first pull-up signal and a first pull-down signal, a second buffer circuit for outputting a second horizontal driving signal in response to a second pull-up signal and a second pull-down signal, and an equipotential switch for selectively short-circuiting or disconnecting output terminals of the first and second horizontal driving signals of the first and second buffer circuits, in response to a logic state of an equipotential control signal.

The first buffer circuit may include a first p-type metal-oxide semiconductor field effect transistor (PMOSFET) having a source and a drain connected to a first power source and the output terminal of the first horizontal driving signal, respectively, and a gate that receives the first pull-up signal, and a first n-type metal-oxide semiconductor field effect transistor (NMOSFET) having a source and a drain connected to a second power source and the output terminal of the first horizontal driving signal, respectively, and a gate that receives the first pull-down signal. The second buffer circuit may include a second PMOSFET having a source and a drain connected to the first power source and the output terminal of the second horizontal driving signal, respectively, and a gate that receives the second pull-up signal, and a second NMOSFET having a source and a drain connected to the second power source and the output terminal of the second horizontal driving signal, respectively, and a gate that receives the second pull-down signal.

The horizontal CCD driving circuit may further include a delay circuit for generating first, second, and third delayed signals from a clock signal, a first logic circuit for performing a logic XOR operation on the first and second delayed signals and generating the equipotential control signal, a second logic circuit for performing a logic AND calculation on the clock signal and the third delayed signal and generating the first pull-down signal, a third logic circuit for performing a logic NOR calculation on the clock signal and the third delayed signal and generating the second pull-down signal, a first inverter for inverting the second pull-down signal and generating the first pull-up signal, and a second inverter for inverting the first pull-down signal and generating the second pull-up signal.

At least one of the above and other features and advantages of the present invention may be realized by providing a solid-state image-sensing device including photodiodes, disposed in a two-dimensional matrix of rows and columns, for converting light into electrical signals and outputting the electrical signals as image signals, a vertical CCD for receiving the image signals from the photodiodes and vertically transmitting the image signals at each column, and a horizontal CCD for receiving the vertically transmitted image signals from the vertical CCD and horizontally transmitting the image signals, wherein the horizontal CCD horizontally transmits the vertically transmitted image signals using first and second horizontal driving signals generated from a clock signal, the output terminals of the first and second horizontal driving signals are in a floating state for a predetermined time after rising and falling of the clock signal, and the output terminals of the first and second horizontal driving signals are short-circuited when in the floating state and maintain an equipotential of a predetermined middle voltage.

The horizontal CCD may have a horizontal CCD driving circuit including an inverter to invert the clock signal and output the first horizontal driving signal, a buffer circuit to buffer the clock signal and output the second horizontal driving signal, a first output switch for selectively outputting or not outputting the first horizontal driving signal in response to a logic state of a first control signal, a second output switch for selectively outputting or not outputting the second horizontal driving signal in response to the logic state of the first control signal, and an equipotential switch for selectively short-circuiting or disconnecting the output terminals of the first and second horizontal driving signals of the first and second output switches in response to a logic state of a second control signal.

The horizontal CCD may have a horizontal CCD driving circuit including a first buffer circuit for outputting the first horizontal driving signal in response to a first pull-up signal and a first pull-down signal, a second buffer circuit for outputting the second horizontal driving signal in response to a second pull-up signal and a second pull-down signal, and an equipotential switch for selectively short-circuiting or disconnecting the output terminals of the first and second horizontal driving signals of the first and second buffer circuits in response to a logic state of an equipotential control signal.

At least one of the above and other features and advantages of the present invention may be realized by providing a driving method of a horizontal CCD of a solid-state image-sensing device, including inverting a clock signal and outputting the inverted clock signal as a first horizontal driving signal, buffering the clock signal and outputting a second horizontal driving signal, selectively outputting or not outputting the first horizontal driving signal in response to a logic state of a first control signal, selectively outputting or not outputting the second horizontal driving signal in response to the logic state of the first control signal, selectively short-circuiting or disconnecting output terminals of the first and second horizontal driving signals of the first and second output switches in response to a logic state of a second control signal, the logic state of the second control signal changing at a different time than the logic state of the first control signal, and horizontally transmitting image signals using signals of the output terminals of the first and second horizontal driving signals.

The first control signal may change from a second logic state to a first logic state and remains in the first logic state for a predetermined time during rising and falling of the clock signal. The second control signal may change from the first logic state to the second logic state and stays in the second logic state for a predetermined time while the first control signal is in the first logic state.

The output terminals may be short-circuited and remain equipotentialized at a predetermined middle voltage while the first control signal is in the first logic state and the second control signal is in the second logic state, during a predetermined time interval between when the logic states of the first and second control signals change.

At least one of the above and other features and advantages of the present invention may be realized by providing a driving method of a horizontal CCD of a solid-state image-sensing device, including outputting a first horizontal driving signal in response to a first pull-up signal and a first pull-down signal, outputting a second horizontal driving signal in response to a second pull-up signal and a second pull-down signal, selectively short-circuiting or disconnecting output terminals of the first and second horizontal driving signals of first and second buffer circuits in response to a logic state of an equipotential control signal, and horizontally transmitting image signals using signals of the output terminals of the first and second horizontal driving signals.

The driving method may further include generating first, second, and third delayed signals from a clock signal, performing a logic XOR operation on the first and second delayed signals and generating the equipotential control signal, performing a logic AND calculation on the clock signal and the third delayed signal and outputting the results as the first pull-down signal, performing a logic NOR calculation on the clock signal and the third delayed signal and outputting the results as the second pull-down signal, inverting the second pull-down signal and outputting the results as the first pull-up signal, and inverting the first pull-down signal and outputting the results as the second pull-up signal.

At least one of the above and other features and advantages of the present invention may be realized by providing a driving method in a solid-state image-sensing device, including converting light into an electrical signal, and outputting the electrical signals as image signals using photodiode arranged in a two-dimensional array, vertically transmitting the image signals from the photodiodes at each column of the two-dimensional array, and horizontally transmitting the vertically transmitted image signals using first and second horizontal driving signals generated from a clock signal, wherein output terminals of the first and second horizontal driving signals are in a floating state for a predetermined time after rising and falling of the clock signal, and the output terminals of the first and second horizontal driving signals are short-circuited when in the floating state and maintain an equipotential of a predetermined middle voltage.

Horizontally transmitting the vertically transmitted image signals may include inverting the clock signal and outputting the inverted clock signal as the first horizontal driving signal, buffering the clock signal and outputting the second horizontal driving signal, selectively outputting or not outputting the first horizontal driving signal in response to a logic state of a first control signal, selectively outputting or not outputting the second horizontal driving signal in response to the logic state of the first control signal, selectively short-circuiting or disconnecting the output terminals of the first and second horizontal driving signals of first and second output switches in response to a logic state of a second control signal, and the horizontal CCD horizontally transmitting the image signals using signals of the output terminals of the first and second horizontal driving signals.

Horizontally transmitting the vertically transmitted image signals may include outputting the first horizontal driving signal in response to a first pull-up signal and a first pull-down signal, outputting a second horizontal driving signal in response to a second pull-up signal and a second pull-down signal, and selectively short-circuiting or disconnecting output terminals of the first and second horizontal driving signals of first and second buffer circuits in response to a logic state of an equipotential control signal.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Korean Patent Application No. 2004-33075, filed on May 11, 2004, in the Korean Intellectual Property Office, and entitled: "Horizontal Charge Coupled Device Driving Circuit Improving Power Consumption, Solid State Image Sensing Device Having It, and Driving Method Thereof," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. Like reference numerals refer to like elements throughout.

Figure 3:
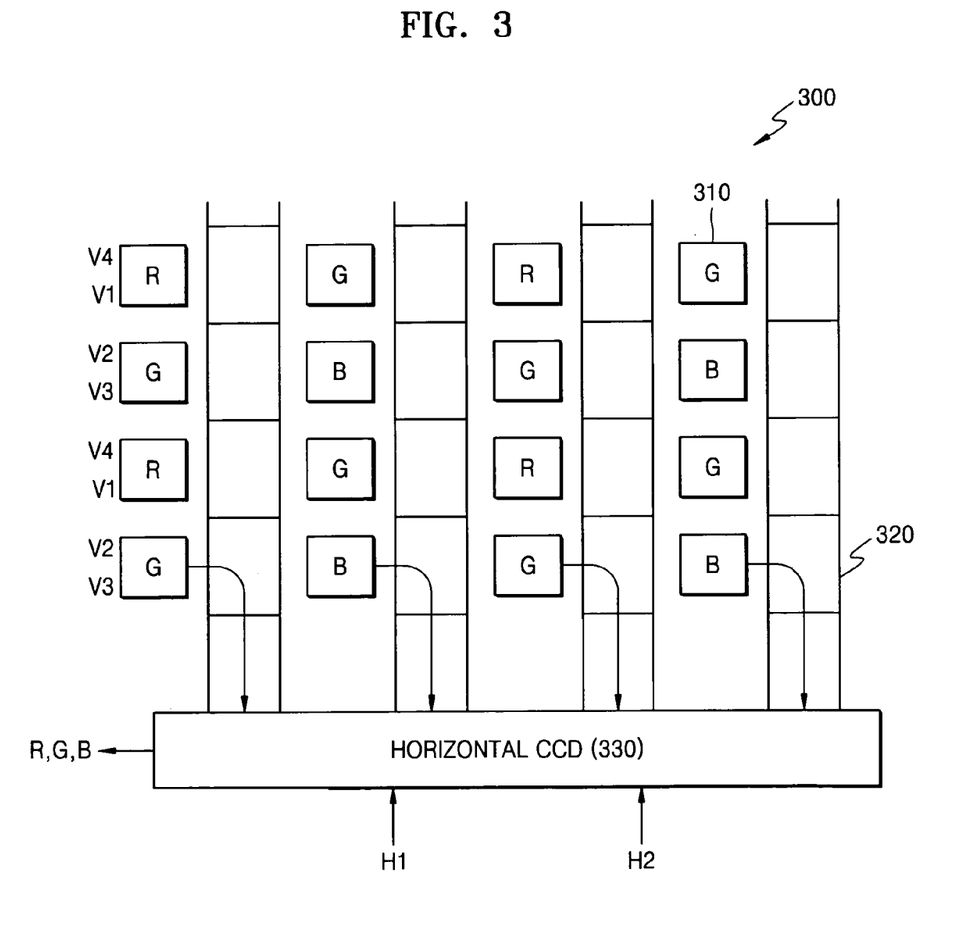
FIG. 3 is a block diagram of a CCD solid-state image-sensing device according to an embodiment of the present invention.

FIG. 3 is a block diagram of a charge coupled device (CCD) solid-state image-sensing device 300 according to an embodiment of the present invention. Referring to FIG. 3, the CCD solid-state image-sensing device 300 includes photodiodes 310, a vertical CCD 320, and a horizontal CCD 330.

The CCD solid-state image-sensing device 300 is a CCD-type image-sensing device mounted in a small device, e.g., a mobile phone or a digital still camera, that senses visible images, converts the images into electrical signals, and outputs the electrical signals as image signals. The CCD solid-state image-sensing device 300 senses external light using the photodiodes 310, converts the light into electrical signals, and outputs the electrical signals as image signals. The photodiodes 310 form a two-dimensional pixel array. As is well known, a color filter array is disposed on top of the photodiodes 310 that form each pixel. Generally, a color filter is disposed on top of each pixel so that only light of a certain wavelength is received by that pixel. To form a color signal, at least three types of color filters are used. The basic color filter array is a Bayer pattern created by alternately arranging filters in one row containing two colors, e.g., red (R) and green (G), and in another row containing two colors, e.g., G and blue (B). Here, G, which is closely related to a brightness signal, is disposed in all rows, and R and B are disposed alternately to attain a high brightness resolution. To attain a high brightness resolution, a CCD having more than one million pixels is used.

Although the CCD solid-state image-sensing device 300 typically drives the vertical CCD 320 using four-phase driving signals V1 through V4, it is not limited to the four-phase driving signals V1 through V4. The vertical CCD 320 vertically transmits signal charges from one row of pixels selected from two consecutive rows during one field period, and transmits signal charges from the other row of pixels selected from the two consecutive rows during a successive field to the horizontal CCD 330 for each field. A method of four-phase driving is well known. For example, the vertical CCD 320 receives the image signals sensed by the photodiodes 310 using the vertical driving signals V1 through V4, vertically transmits the image signals at each column in units of rows, and outputs the image signals to the horizontal CCD 330.

The horizontal CCD 330 receives the image signals of each column in units of rows from the vertical CCD 320 using first and second horizontal driving signals H1 and H2, and outputs the image signals by transmitting them horizontally. In particular, in the present invention, horizontal CCD driving circuits 400 (illustrated in FIG. 4) and 600 (illustrated in FIG. 6), included in a predetermined controller (not shown), generate the first and second horizontal driving signals H1 and H2 according to an embodiment of the present invention to reduce power consumption. In other words, the first and second horizontal driving signals H1 and H2, which drive the horizontal CCD 330, are generated by a predetermined clock signal XH generated at the controller. Output terminals of the first and second horizontal driving signals H1 and H2 of the horizontal CCD driving circuits 400 and 600 remain in an equipotential of a predetermined middle voltage when in a floating state for a predetermined time from rising and a predetermined time from falling of the clock signal XH. The horizontal CCD driving circuits 400 and 600 for driving the horizontal CCD 330 will be described in more detail with reference to FIGS. 4 and 6.

Figure 4:
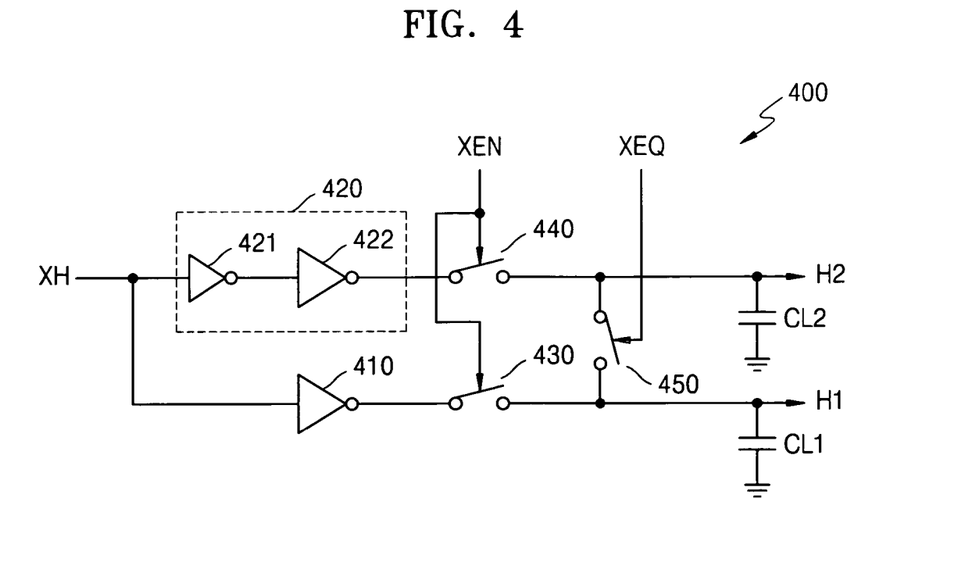
FIG. 4 is a circuit diagram of a horizontal CCD driving circuit that drives the CCD solid-state image-sensing device of FIG. 3 according to a first embodiment of the present invention.
Figure 5:
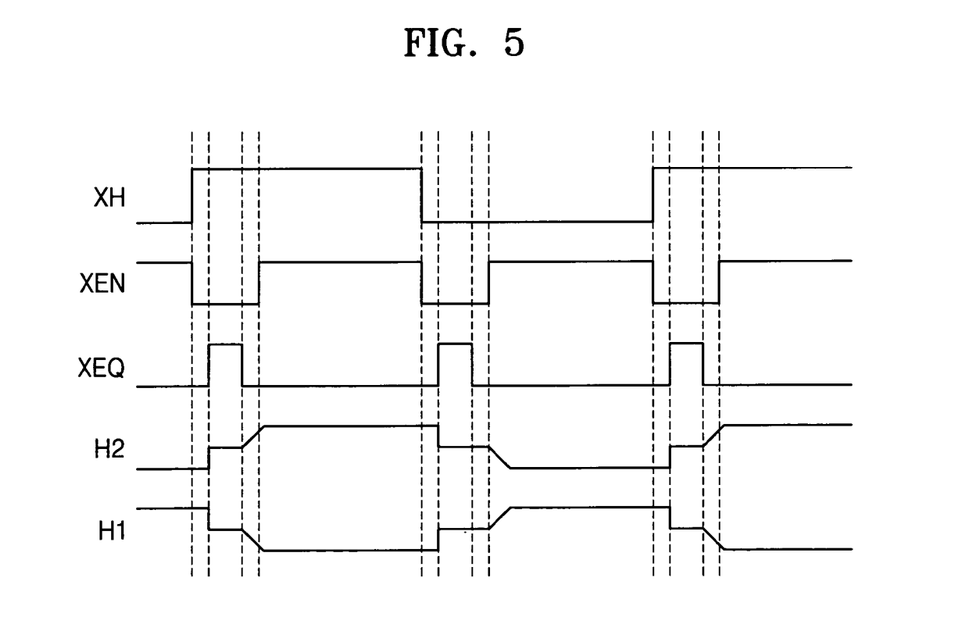
FIG. 5 is a timing diagram for explaining the operation of the horizontal CCD driving circuit of FIG. 4.

FIG. 4 is a circuit diagram of the horizontal CCD driving circuit 400 that drives the CCD solid-state image-sensing device 300 of FIG. 3 according to a first embodiment of the present invention. Referring to FIG. 4, the horizontal CCD driving circuit 400 includes an inverter 410, a buffer circuit 420, a first output switch 430, a second output switch 440, and an equipotential switch 450. FIG. 5 is a timing diagram for explaining the operation of the horizontal CCD driving circuit 400 of FIG. 4. The operation of the horizontal CCD driving circuit 400 of FIG. 4 is explained with reference to the timing diagram of FIG. 5.

In FIG. 4, the inverter 410 inverts the clock signal XH and outputs the first horizontal driving signal H1. The inverter 410 may be large to provide a high driving ability. As is well known, other buffers (not shown) may be disposed before the inverter 410 to increase driving ability over a number of steps. The buffer circuit 420 includes an even number of inverters, e.g., first and second inverters 421 and 422. The buffer circuit 420 buffers the clock signal XH and outputs the second horizontal driving signal H2. Similarly, the second inverter 422 at the end of the buffer circuit 420 may be large to provide a high driving ability.

The first output switch 430 responds to a logic state of a first control signal XEN, and selectively outputs or does not output the first horizontal driving signal H1. The first control signal XEN, as illustrated in FIG. 5, is a signal that is converted from a second logic state (logic high) to a first logic state (logic low), and remains in the first logic state for a predetermined time during rising and falling of the clock signal XH. The second output switch 440 responds to the logic state of the first control signal XEN, and selectively outputs or does not output the second horizontal driving signal H2. In other words, when the first control signal XEN is in the first logic state, the first and second output switches 430 and 440 are open. Accordingly, the output terminals of the first and second horizontal driving signals H1 and H2 of the first and second output switches 430 and 440, respectively, are in the floating state. Here, the output terminals of the first and second horizontal driving signals H1 and H2 are maintained at their previous voltage due to parasitic capacitors CL1 and CL2.

The equipotential switch 450 responds to a logic state of a second control signal XEQ, and either short circuits or disconnects the output terminals of the first and second horizontal driving signals H1 and H2 of the first and second output switches 430 and 440, respectively. The second control signal XEQ, as illustrated in FIG. 5, is a signal that is converted from a first logic state (logic low) to a second logic state (logic high), and remains in the second logic state for a predetermined time while the first control signal XEN is in the first logic state. While the first control signal XEN is in the first logic state and the second control signal XEQ is in the second logic state, the equipotential switch 450 short circuits the output terminals of the first and second horizontal driving signals H1 and H2. Accordingly, as illustrated in FIG. 5, by short-circuiting the output terminals of the first and second horizontal driving signals H1 and H2, the output terminals of the first and second horizontal driving signals H1 and H2 of the first and second switches 430 and 440, respectively, remain at an equipotential of a predetermined middle voltage.

As such, since the middle voltage is used during the transition of the first and second horizontal driving signals H1 and H2, the inverter 410 and the buffer circuit 420 charge and discharge the capacitors CL1 and CL2 with half the voltage amplitude compared to the conventional method, thereby reducing the power consumption according to Equation (1). In addition, since the inverter 410 and the buffer circuit 420, and the equipotential switch 450 are not activated at the same time, a current path is not formed between power and ground, thereby reducing power consumption.

Figure 6:
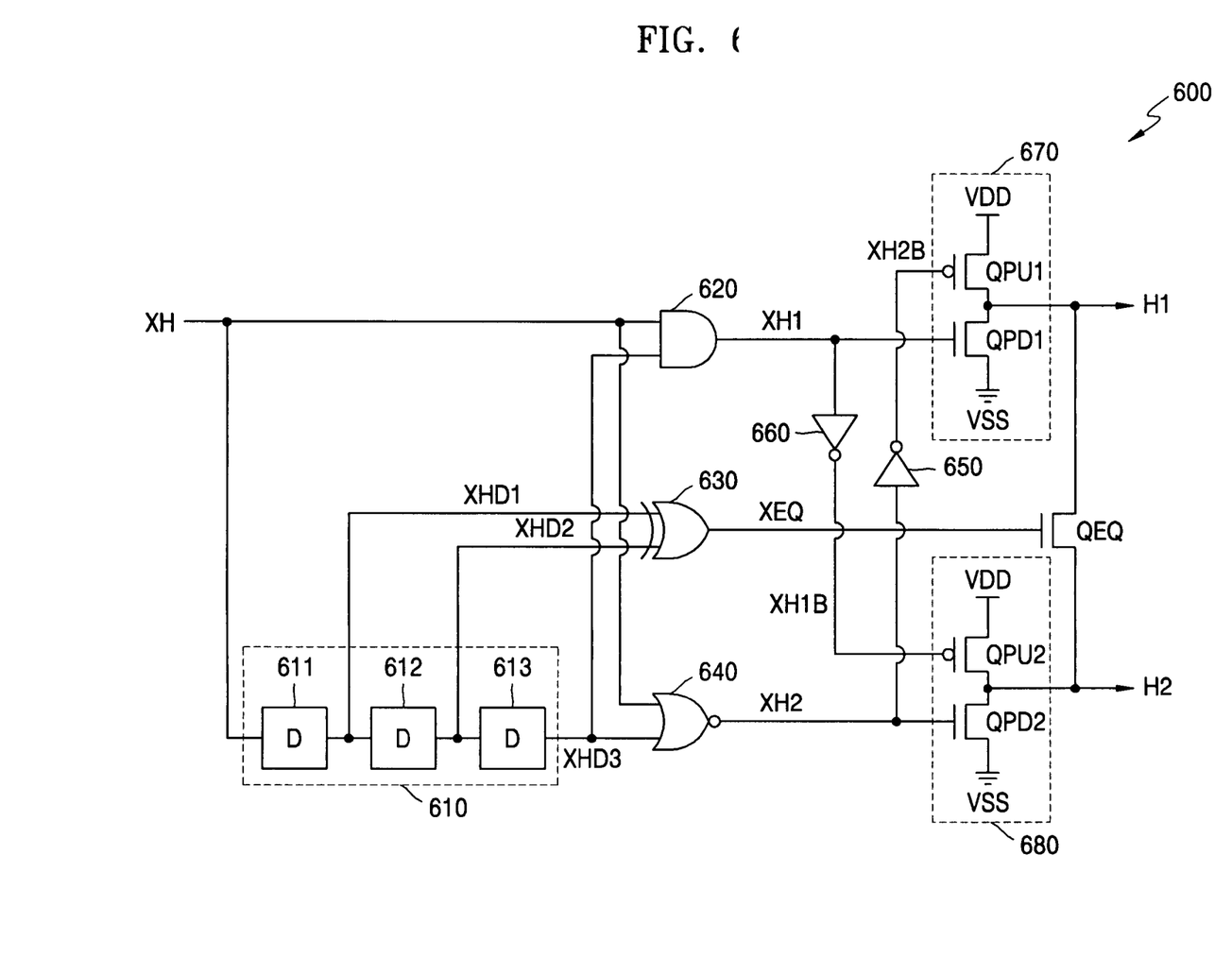
FIG. 6 is a circuit diagram of a horizontal CCD driving circuit that drives the CCD solid-state image-sensing device of FIG. 3 according to a second embodiment of the present invention.
Figure 7:
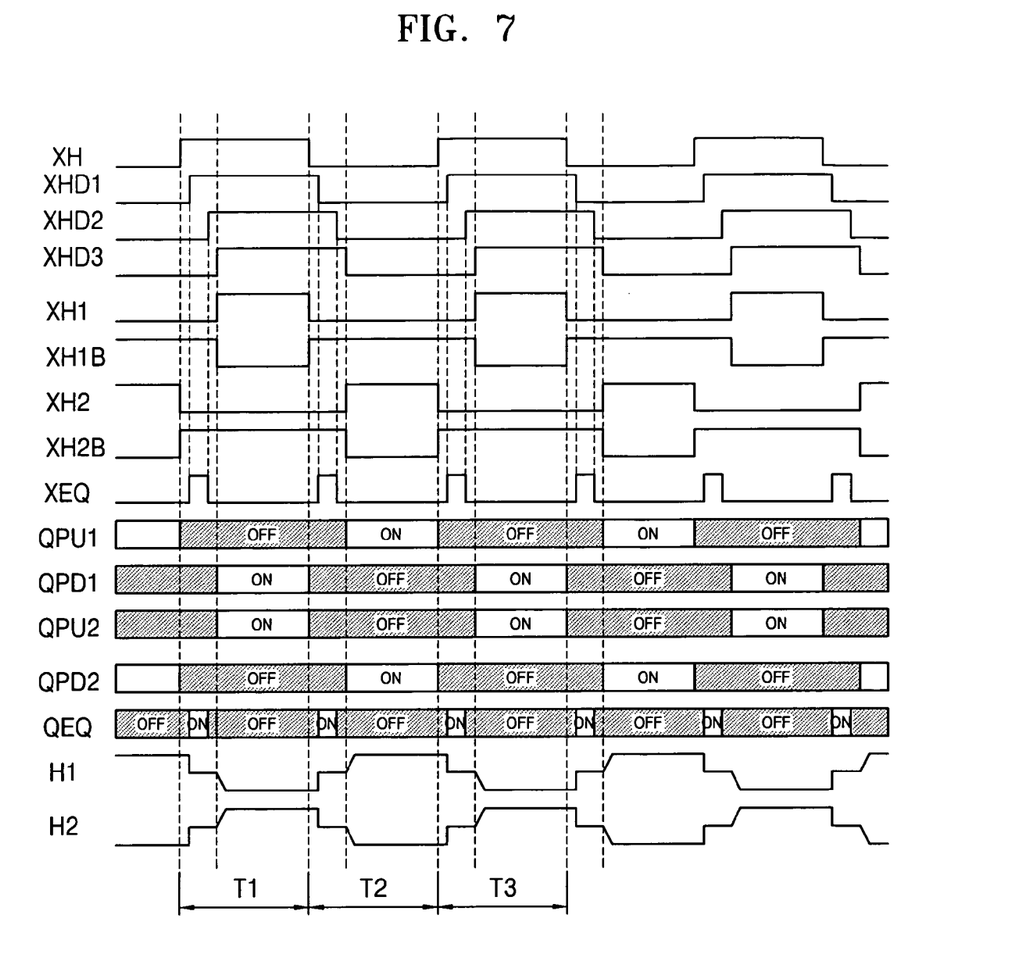
FIG. 7 is a timing diagram for explaining the operation of the horizontal CCD driving circuit of FIG. 6.

FIG. 6 is a circuit diagram of the horizontal CCD driving circuit 600 that drives the CCD solid-state image-sensing device 300 of FIG. 3 according to a second embodiment of the present invention. Referring to FIG. 6, the horizontal CCD driving circuit 600 includes a delay circuit 610, a first logic circuit 630, a second logic circuit 620, a third logic circuit 640, a first inverter 650, a second inverter 660, a first buffer circuit 670, a second buffer circuit 680, and an equipotential switch QEQ. FIG. 7 is a timing diagram for explaining the operation of the horizontal CCD driving circuit 600 of FIG. 6. The operation of the horizontal CCD driving circuit 600 is explained with reference to the timing diagram of FIG. 7.

In FIG. 6, the delay circuit 610 receives a clock signal XH and generates first, second, and third delayed signals XHD1 through XHD3 using delay elements 611, 612, and 613, respectively. The first logic circuit 630 performs an exclusive OR (XOR) logic operation on the first and second delayed signals XHD1 and XHD2, and generates an equipotential signal XEQ. The second logic circuit 620 performs an AND logic operation on the clock signal XH and the third delayed signals XHD3, and generates a first pull-down signal XH1. The third logic circuit 640 performs a NOR logic operation on the clock signal XH and the third delayed signal XHD3, and generates a second pull-down signal XH2. The first inverter 650 inverts the second pull-down signal XH2 and generates a first pull-up signal XH2B. The second inverter 660 inverts the first pull-down signal XH1 and generates a second pull-up signal XH1B.

The first buffer circuit 670 includes a first p-type metal-oxide semiconductor field effect transistor (PMOSFET) QPU1 and a first n-type metal-oxide semiconductor field effect transistor (NMOSFET) QPD1. A source and a drain of the first PMOSFET QPU1 are connected to a first power source VDD and an output terminal of the first horizontal driving signal H1, respectively, and a gate of the first PMOSFET QPU1 receives the first pull-up signal XH2B. A source and a drain of the first NMOSFET QPD1 are connected to a second power source VSS and the output terminal of the first horizontal driving signal H1, respectively, and a gate of the first NMOSFET QPD1 receives the first pull-down signal XH1. Accordingly, the first buffer circuit 670 responds to the first pull-up signal XH2B and the first pull-down signal XH1, and outputs a first horizontal driving signal H1.

The second buffer circuit 680 includes a second PMOSFET QPU2 and a second NMOSFET QPD2. A source and a drain of the second PMOSFET QPU2 are connected to the first power source VDD and an output terminal of the second horizontal driving signal H2, respectively, and a gate of the second PMOSFET QPU2 receives the second pull-up signal XH1B. A source and a drain of the second NMOSFET QPD2 are connected to the second power source VSS and the output terminal of the second horizontal driving signal H2, respectively, and a gate of the second NMOSFET QPD2 receives the second pull-down signal XH2. Accordingly, the second buffer circuit 680 responds to the second pull-up signal XH1B and the second pull-down signal XH2, and outputs a second horizontal driving signal H2.

The equipotential switch QEQ responds to the logic state of the equipotential control signal XEQ, and either short-circuits or disconnects the output terminals of the first and second horizontal driving signals H1 and H2 of the first and second buffer circuits 670 and 680, respectively.

Accordingly, referring to FIG. 7, the first and second PMOSFETs QPU1 and QPU2 and the first and second NMOSFETs QPD1 and QPD2 are all off for a predetermined time from rising or falling of the clock signal XH. Thus, the output terminals of the first and second horizontal driving signals H1 and H2 are in the floating state. Here, the output terminals of the first and second horizontal driving signals H1 and H2 are maintained at their previous voltage due to parasitic capacitors (not shown). In such a floating state, the equipotential control signal XEQ is in a second logic state for a predetermined time, and, thus, the equipotential switch QEQ short circuits between the output terminals of the first and second horizontal driving signals H1 and H2. Accordingly, as illustrated in FIG. 7, due to the short-circuited output terminals of the first and second horizontal driving signals H1 and H2, the output terminals of the first and second horizontal driving signals H1 and H2 remain at an equipotential of a predetermined middle voltage.

As such, since the middle voltage is used during transition of the first and second horizontal driving signals H1 and H2, the first and second buffer circuits 670 and 680 respectively charge and discharge the capacitors with half the voltage amplitude compared to the conventional method, thereby reducing the power consumption according to Equation (1). In addition, since the activation of the first and second buffer circuits 670 and 680 and the activation of the equipotential switch does not occur at the same time, a current path is not formed between the first power source VDD and the second power source VSS, thereby reducing the power consumption.

Figure 8:
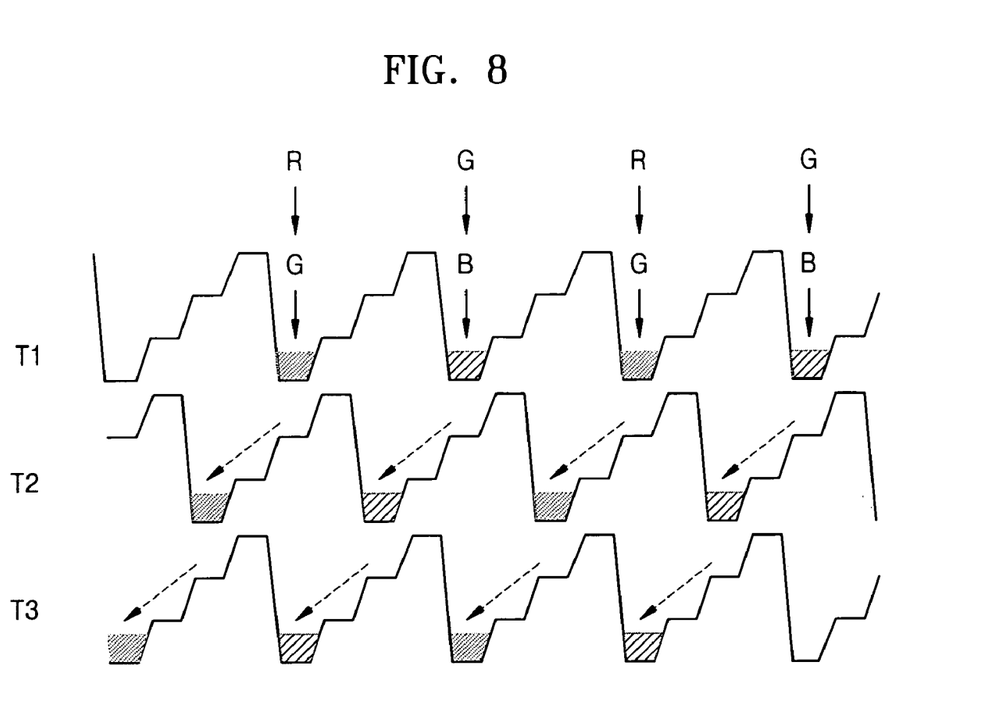
FIG. 8 is an energy diagram to explain the movement of electric charges in the horizontal CCD driving circuit of FIG. 3.

FIG. 8 is an energy diagram to explain the movement of electric charges in the horizontal CCD driving circuit 300 of FIG. 3. Referring to FIG. 8, the vertical CCD 320 vertically transmits the image signals at each column in units of rows and outputs the image signals to the horizontal CCD 330. Then, the horizontal CCD 330 outputs the image signals received by each column in units of rows from the vertical CCD 320 using the horizontal driving signals H1 and H2 by horizontally transmitting the image signals. For example, the horizontal CCD 330 receives the image signals from a (G, B) row (a row with alternating green and blue colors) from the vertical CCD 320, which are transmitted at tens of kHz, and horizontally transmits the image signals at tens of MHz, then horizontally transmits the image signals from a (R, G) row (a row with red and green colors alternating) at the same speed as the (G, B) row are transmitted, and such operations are repeated. Electrodes which receive signals from the output terminals of the first and second horizontal driving signals H1 and H2, alternate between first and second logic states. Therefore, image signal packets T1, T2, and T3 transmitted through the horizontal CCD 330 are output by shifting one electrode in each period of the first and second horizontal driving signals H1 and H2, as illustrated in FIG. 8. Since a method of transmitting the image signal packets in such horizontal CCD 330 is well known, further description will be omitted. Three-color (red, green, and blue) signals R, G, and B output from the horizontal CCD 330 are provided to an interpolator 130 of FIG. 1 and transmitted to a display device, e.g., a liquid crystal display (LCD).

As described-above, the CCD solid-state image-sensing device 300 according to an embodiment of the present invention is operated by the horizontal CCD 330 driven by the first and second horizontal driving signals H1 and H2 having a middle or intermediate voltage during rising and falling of the clock signal XH. The middle voltage of the first and second horizontal driving signals H1 and H2 is generated by the equipotential switch QEQ during the floating state of output nodes of the buffer circuits 670 and 680.

When driving a solid-state image-sensing device according to an embodiment of the present invention, a middle voltage is used during transition of first and second horizontal driving signals. Thus, power consumption caused by charging and discharging capacitors is reduced. In addition, activation time of buffer circuits and an equipotential switch does not occur simultaneously. Accordingly, a current path is not formed between a power source and ground in the buffer circuits, thereby further reducing the power consumption. Therefore, it is advantageous for the present invention to be adopted in small mobile devices, e.g., mobile phones or digital still cameras, which require low power consumption.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A horizontal charge coupled device (CCD) driving circuit of a solid-state image-sensing device, the horizontal CCD driving circuit comprising:
   an inverter for inverting a clock signal and outputting a first horizontal driving signal;
   a buffer circuit for buffering the clock signal and outputting a second horizontal driving signal;
   a first output switch for selectively outputting or not outputting the first horizontal driving signal in response to a logic state of a first control signal;
   a second output switch for selectively outputting or not outputting the second horizontal driving signal in response to the logic state of the first control signal; and
   an equipotential switch for selectively short-circuiting or disconnecting output terminals of the first and second horizontal driving signals of the first and second output switches in response to a logic state of a second control signal, wherein the logic state of the second control signal changes at a different time than the logic state of the first control signal, wherein the first control signal changes from a second logic state to a first logic state and remains in the first logic state for a predetermined time after rising and falling of the clock signal.

2. The horizontal CCD driving circuit as claimed in claim 1, wherein the second control signal changes from the first logic state to the second logic state and remains in the second logic state for a predetermined time while the first control signal is in the first logic state.

3. The horizontal CCD driving circuit as claimed in claim 1, wherein the equipotential switch keeps the output terminals of the first and second horizontal driving signals of the first and second output switches in an equipotential of a predetermined middle voltage by short-circuiting the output terminals while the first control signal is in the first logic state and the second control signal is in the second logic state, and wherein the inverter, the buffer circuit, and the equipotential switch are not simultaneously activated during a predetermined time interval between when the logic states of the first and second control signals change.

4. A horizontal CCD driving circuit of a solid-state image-forming device, the horizontal CCD driving circuit comprising:
   a first buffer circuit for outputting a first horizontal driving signal in response to a first pull-up signal and a first pull-down signal;
   a second buffer circuit for outputting a second horizontal driving signal in response to a second pull-up signal and a second pull-down signal; and
   an equipotential switch for selectively short-circuiting or disconnecting output terminals of the first and second horizontal driving signals of the first and second buffer circuits, in response to a logic state of an equipotential control signal, wherein
   logic states of the equipotential control signal change at different times than logic states of any of the first pull-up signal, the first pull-down signal, the second pull-up signal and the second pull-down signal,
   the first control signal changes from a second logic state to a first logic state and remains in the first logic state for a predetermined time after rising and falling of the clock signal, and
   the first pull-down signal changes from a second logic state to a first logic state and remains in the first logic state for a predetermined time after rising of a clock signal used to generate the first pull-up signal, the first pull-down signal, the second pull-up signal and the second pull-down signal and the second pull-down signal changes from the second logic state to the first logic state and remains in the first logic state for a predetermined time after falling of the clock signal.

5. The horizontal CCD driving circuit as claimed in claim 4, wherein the first buffer circuit comprises:
   a first p-type metal-oxide semiconductor field effect transistor (PMOSFET) having a source and a drain connected to a first power source and the output terminal of the first horizontal driving signal, respectively, and a gate that receives the first pull-up signal; and
   a first n-type metal-oxide semiconductor field effect transistor (NMOSFET) having a source and a drain connected to a second power source and the output terminal of the first horizontal driving signal, respectively, and a gate that receives the first pull-down signal,
   wherein the second buffer circuit comprises:
   a second PMOSFET having a source and a drain connected to the first power source and the output terminal of the second horizontal driving signal, respectively, and a gate that receives the second pull-up signal; and
   a second NMOSFET having a source and a drain connected to the second power source and the output terminal of the second horizontal driving signal, respectively, and a gate that receives the second pull-down signal.

6. The horizontal CCD driving circuit as claimed in claim 4, wherein the horizontal CCD driving circuit of the solid-state image-sensing device further comprises:
   a delay circuit for generating first, second, and third delayed signals from the clock signal;
   a first logic circuit for performing a logic XOR operation on the first and second delayed signals and generating the equipotential control signal;
   a second logic circuit for performing a logic AND calculation on the clock signal and the third delayed signal and generating the first pull-down signal;
   a third logic circuit for performing a logic NOR calculation on the clock signal and the third delayed signal and generating the second pull-down signal;
   a first inverter for inverting the second pull-down signal and generating the first pull-up signal; and
   a second inverter for inverting the first pull-down signal and generating the second pull-up signal.

7. A solid-state image-sensing device, comprising:
   photodiodes, disposed in two-dimensional matrix of rows and columns, for converting light into electrical signals and outputting the electrical signals as image signals;

a vertical CCD for receiving the image signals from the photodiodes and vertically transmitting the image signals at each column; and a horizontal CCD for receiving the vertically transmitted image signals from the vertical CCD and horizontally transmitting the image signals, wherein the horizontal CCD horizontally transmits the vertically transmitted image signals using first and second horizontal driving signals generated from a clock signal, the output terminals of the first and second horizontal driving signals are in a floating state for a predetermined time after rising and falling of the clock signal, and the output terminals of the first and second horizontal driving signals are short-circuited when in the floating state and maintain an equipotential of a predetermined middle voltage.

8. The solid-state image-sensing device as claimed in claim 7, wherein the horizontal CCD receives the first and second horizontal driving signals from a horizontal CCD driving circuit, and the horizontal CCD driving circuit comprises:

an inverter to invert the clock signal and output the first horizontal driving signal;

a buffer circuit to buffer the clock signal and output the second horizontal driving signal;

a first output switch for selectively outputting or not outputting the first horizontal driving signal in response to a logic state of a first control signal;

a second output switch for selectively outputting or not outputting the second horizontal driving signal in response to the logic state of the first control signal; and an equipotential switch for selectively short-circuiting or disconnecting the output terminals of the first and second horizontal driving signals of the first and second output switches in response to a logic state of a second control signal.

9. The solid-state image-sensing device as claimed in claim 7, wherein the horizontal CCD receives the first and second horizontal driving signals from a horizontal CCD driving circuit, and the horizontal CCD driving circuit comprises:

a first buffer circuit for outputting the first horizontal driving signal in response to a first pull-up signal and a first pull-down signal;

a second buffer circuit for outputting the second horizontal driving signal in response to a second pull-up signal and a second pull-down signal; and an equipotential switch for selectively short-circuiting or disconnecting the output terminals of the first and second horizontal driving signals of the first and second buffer circuits in response to a logic state of an equipotential control signal.

10. A driving method of a horizontal CCD of a solid-state image-sensing device, the driving method comprising:

inverting a clock signal and outputting the inverted clock signal as a first horizontal driving signal;

buffering the clock signal and outputting a second horizontal driving signal;

selectively outputting or not outputting the first horizontal driving signal in response to a logic state of a first control signal;

selectively outputting or not outputting the second horizontal driving signal in response to the logic state of the first control signal;

selectively short-circuiting or disconnecting output terminals of the first and second horizontal driving signals of the first and second output switches in response to a logic state of a second control signal, the logic state of the second control signal changing at a different time than the logic state of the first control signal, wherein the first control signal changes from a second logic state to a first logic state and remains in the first logic state for a predetermined time during rising and falling of the clock signal; and horizontally transmitting image signals using signals of the output terminals of the first and second horizontal driving signals.

11. The driving method as claimed in claim 10, wherein the second control signal changes from the first logic state to the second logic state and stays in the second logic state for a predetermined time while the first control signal is in the first logic state.

12. The driving method as claimed in claim 10, wherein the output terminals are short-circuited and remain equipotentialized at a predetermined middle voltage while the first control signal is in the first logic state and the second control signal is in the second logic state, and a predetermined time interval between when the logic states of the first and second control signals change.

13. A driving method of a horizontal CCD of a solid-state image-sensing device, the driving method comprising:

outputting a first horizontal driving signal in response to a first pull-up signal and a first pull-down signal;

outputting a second horizontal driving signal in response to a second pull-up signal and a second pull-down signal;

selectively short-circuiting or disconnecting output terminals of the first and second horizontal driving signals of first and second buffer circuits in response to a logic state of an equipotential control signal; and horizontally transmitting image signals using signals of the output terminals of the first and second horizontal driving signals, wherein logic states of the equipotential control signal change at different times than logic states of any of the first pull-up signal, the first pull-down signal, the second pull-up signal and the second pull-down signal, and the first pull-down signal changes from a second logic state to a first logic state and remains in the first logic state for a predetermined time after rising of a clock signal used to generate the first pull-up signal, the first pull-down signal, the second pull-up signal and the second pull-down signal and the second pull-down signal changes from the second logic state to the first logic state and remains in the first logic state for a predetermined time after falling of the clock signal.

14. The driving method as claimed in claim 13, further comprising:

generating first, second, and third delayed signals from the clock signal;

performing a logic XOR operation on the first and second delayed signals and generating the equipotential control signal;

performing a logic AND calculation on the clock signal and the third delayed signal and outputting the results as the first pull-down signal;

performing a logic NOR calculation on the clock signal and the third delayed signal and outputting the results as the second pull-down signal;

inverting the second pull-down signal and outputting the results as the first pull-up signal; and inverting the first pull-down signal and outputting the results as the second pull-up signal.

15. A driving method in a solid-state image-sensing device, the driving method comprising:

converting light into an electrical signal, and outputting the electrical signals as image signals using photodiode arranged in a two-dimensional array;

vertically transmitting the image signals from the photodiodes at each column of the two-dimensional array; and horizontally transmitting the vertically transmitted image signals using first and second horizontal driving signals generated from a clock signal, wherein output terminals of the first and second horizontal driving signals are in a floating state for a predetermined time after rising and falling of the clock signal, and the output terminals of the first and second horizontal driving signals are short-circuited when in the floating state and maintain an equipotential of a predetermined middle voltage.

16. The driving method as claimed in claim 15, wherein horizontally transmitting the vertically transmitted image signals comprises:

inverting the clock signal and outputting the inverted clock signal as the first horizontal driving signal;

buffering the clock signal and outputting the second horizontal driving signal;

selectively outputting or not outputting the first horizontal driving signal in response to a logic state of a first control signal;

selectively outputting or not outputting the second horizontal driving signal in response to the logic state of the first control signal;

selectively short-circuiting or disconnecting the output terminals of the first and second horizontal driving signals of first and second output switches in response to a logic state of a second control signal; and the horizontal CCD horizontally transmitting the image signals using signals of the output terminals of the first and second horizontal driving signals.

17. The driving method as claimed in claim 15, wherein horizontally transmitting the vertically transmitted image signals comprises:

outputting the first horizontal driving signal in response to a first pull-up signal and a first pull-down signal;

outputting a second horizontal driving signal in response to a second pull-up signal and a second pull-down signal; and selectively short-circuiting or disconnecting output terminals of the first and second horizontal driving signals of first and second buffer circuits in response to a logic state of an equipotential control signal.

* * * * *